United States Patent [19]

Slater et al.

[11] Patent Number: 5,192,603
[45] Date of Patent: Mar. 9, 1993

[54] PROTECTION OF SUBSTRATES AGAINST AQUATIC FOULING

[75] Inventors: William W. Slater; John Kelly; Michael J. Winter, all of Houston, Tex.

[73] Assignee: Courtaulds Coatings Inc., Houston, Tex.

[21] Appl. No.: 759,673

[22] Filed: Sep. 13, 1991

[51] Int. Cl.$^5$ .................... B32B 7/02; B32B 27/40
[52] U.S. Cl. ................... 428/217; 114/67 R; 114/222; 427/407.1; 427/412.3; 428/332; 428/425.1; 428/425.5; 428/448; 428/451; 428/907
[58] Field of Search .................... 114/67 R, 222; 427/407.1, 412.3; 428/217, 332, 425.1, 425.5, 448, 451, 907

[56] References Cited

U.S. PATENT DOCUMENTS

| | | | |
|---|---|---|---|
| 4,025,693 | 5/1977 | Milne | 428/447 |
| 4,273,833 | 6/1981 | DeLong | 428/411 |
| 4,894,428 | 1/1990 | Thoma et al. | 528/45 |

FOREIGN PATENT DOCUMENTS

| | | |
|---|---|---|
| 53-137234 | 11/1978 | Japan . |
| 1307001 | 2/1973 | United Kingdom . |
| 2141436 | 12/1984 | United Kingdom . |

OTHER PUBLICATIONS

Bioclean Brochure of Chugoku Marine Paint Ltd.

*Primary Examiner*—Paul J. Thibodeau
*Assistant Examiner*—D. S. Nakarani
*Attorney, Agent, or Firm*—Davis Hoxie

[57] ABSTRACT

A process for protecting a rigid substrate against aquatic fouling comprises coating the substrate with an elastomeric undercoat as a 200 to 1500 micron thick layer and with a top coat of a room temperature vulcanisable silicone rubber. The elastomeric undercoat is generally harder than the room temperature vulcanisable silicone rubber foul resistant top coat and preferably has a Shore A hardness of 60 to 90 and an extensibility of 200 to 800%. The abrasion and tear resistance of the silicone rubber foul resistant layer is markedly increased by the use of the elastomeric undercoat.

19 Claims, No Drawings

PROTECTION OF SUBSTRATES AGAINST AQUATIC FOULING

This invention relates to the protection of substrates against fouling by aquatic organisms such as algae and barnacles. Substrates which need such protection are those having a surface which is intended to be in contact with water, for example underwater, at least some of the time in use. The water may be sea water or fresh water. Examples of such substrates are the hulls of ships and other marine craft, the underwater and splash zone surfaces of oil production platforms and cooling water inlets and outlets for power stations.

BACKGROUND TO THE INVENTION

Silicone rubber compositions resistant to settlement by aquatic organisms are described for example in GB-A-1307001, 1581727 and 2141436 and U.S. Pat. Nos. 3702778, 4025693 and 4525565. They have significant advantages over conventional antifouling compositions containing marine biocides which are gradually leached from the paint. The silicone rubber coatings rely on their low surface energy, rather than on biocides, to inhibit settlement of marine organisms and are referred to hereinafter as "foul resistant coatings". Conventional antifouling paints eventually become ineffective as all their biocide is released. Silicone rubber coatings are potentially capable of retaining their low energy surface indefinitely.

There are, however, practical difficulties in the use of silicone rubber foul resistant compositions, especially as coatings for ships hulls. They are mechanically rather weak; in particular they have low abrasion and tear resistance and low cohesive strength so that the coating film is easily damaged. Fouling organisms readily attach to abraded surfaces.

Silicone rubber foul resistant coatings of increased cohesive strength are described in EP-B-32597 and EP-A-89071, which describes silicone rubber coatings having grafted silicone-free segments, and in U.S. Pat. No. 5017322 which describes a simultaneously cured coating of silicone rubber and polyurethane or polyurea, consisting of domains of polyurethane or polyurea within a network of crosslinked silicone elastomer. There is a need for foul resistant coatings with greater abrasion resistance than can be achieved using such coatings. The proportion of silicone-free segments or of polyurethane domains which can be included in the silicone rubber whilst maintaining resistance to fouling is limited.

WO-80/00554 describes the prevention of fouling of a marine structure such as an oil production platform or drilling rig by securing to the underwater surface a coated flexible sheet material, the outermost surface of which is a layer of silicone rubber. The preferred sheet material is a coated fabric. Such a cladding may be feasible for static structures but is less practical for the hulls of ships and other marine craft.

Undercoats for silicone rubber foul resistant coatings are described in JP-A-53-137231, 53-137233 and 53-137234 and FR-A-2636958. JP-A-53-137231 describes a polybutyral silicone rubber mixture, a polyurethane or a chloroprene rubber. JP-A-53-137233 describes a polybutyral silicone rubber mixture. JP-A-53-137234 describes a prepolymer prepared from a polyol and a diisocyanate. These undercoats are generally applied at a thickness such as 30 or 40 microns. They are used solely to promote intercoat adhesion. They have no significant effect on the abrasion and tear resistance of the silicone rubber. FR-A-2636958 describes a mixture of a chlorinated polyolefin with an amine-functional silane or its reaction product with an epoxy functional silane or an alpha, omega-dihydroxypolydimethylsiloxane oil.

SUMMARY OF THE INVENTION

We have found according to the invention that the abrasion and tear resistance of the silicone rubber foul resistant layer can be markedly increased by the use of a suitable undercoat applied as a thick layer.

According to one aspect of the invention a process for protecting a rigid substrate against aquatic fouling comprises coating the substrate with an elastomeric undercoat as a 200 to 1500 micron thick layer and with a top coat of a room temperature vulcanisable silicone rubber. The elastomeric undercoat is generally harder than the room temperature vulcanisable silicone rubber top coat.

The elastomeric undercoat comprises an elastomer, that is a polymer having the ability to be stretched to at least twice its original length and to retract rapidly to approximately its original length when released (retraction at least 90% of extension).

According to another aspect of the invention a process for protecting a rigid substrate against aquatic fouling comprises coating the substrate with an undercoat layer at least 300 microns thick of a coating having a shore A hardness of 60 to 90 and an extensibility of 200 to 800%, and with a top coat of a room temperature vulcanisable silicone rubber.

We have found that the thick elastomeric undercoat greatly increases the resistance of the room temperature vulcanisable silicone rubber top coat to damage by abrasion, tearing or cutting, by absorbing abrasive energy. The service life of the foul resistant silicone rubber coating can thereby be markedly extended. Because the composition of the room temperature vulcanised silicone rubber layer is not changed, its ability to resist aquatic fouling is not impaired. Surprisingly, we have found that the resistance to aquatic fouling is even increased, over and above the reduction in aquatic fouling arising from reduction in abrasion damage.

DETAILED DESCRIPTION OF INVENTION

The elastomeric undercoat can be a thermoplastic elastomer or a cured elastomer. The elastomeric undercoat can be applied as a solution, emulsion or dispersion of a thermoplastic or thermoset elastomer or can be applied as a material vulcanisable on the substrate to an elastomer. If the elastomer is to be vulcanised on the substrate it will usually need to be ambient temperature curing, since it is generally not practical to heat the coating on the substrate.

One example of a suitable elastomer is a polyurethane, polyurea or poly(urethane-urea) elastomer, which can be applied as a solution in organic solvent of a preformed elastomer or as a curable mixture of an isocyanate functional material and an active hydrogen material such as a polyol and/or polyamine. A polyurethane elastomer is suitably formed from a polyisocyanate of functionality at least 2 with a polymeric polyol such as a polyether diol or triol or a polyester diol or triol, and a short chain diol having 2 to 4 carbon atoms. The polyisocyanate can for example be a diisocyanate of the formula $OCN-R^1-NCO$, where $R^1$ is an aromatic, aliphatic, araliphatic or alicyclic group having 6 to 20 carbon atoms, such as toluene diisocyanate, isophorone diisocyanate (3-isocyanatomethyl-3,5,5-trimethylcyclohexyl isocyanate), 1,3-bis(1-isocyanato-1-methylethyl)benzene, hexamethylene diisocyanate, 1,4-bis-(isocyanatomethyl)cyclohexane or bis(4-isocyanatocyclohexyl)methane. A more highly functional polyisocyanate, for example a polymethylene polyphenyl isocyanate having an average of 2.1 to 3.0 isocyanate groups per molecule, can alternatively be used. The polyether polyol is for example a polyoxyethylene glycol, polyoxypropylene glycol or poly(tetramethylene ether) glycol. If a polyester polyol is used it is preferably aliphatic, for example poly(1,4-butylene adipate). The polyether or polyester polyol preferably has a molecular weight of 600–4000. The short chain diol is for example ethylene glycol, propylene glycol or butane-1,4-diol.

An ambient temperature curable polyurethane can for example comprise an isocyanate-tipped polyether diol. An ambient temperature curable polyurea can for example comprise an isocyanate-tipped polyether and a diamine, which can for example be aromatic or alicyclic such as methylene dianiline, diethylmethylbenzenediamine (which is sold as an isomeric mixture comprising mainly 2,4-diethyl-6-methyl-benzene-1,3-diamine) or bis(4-aminocyclohexyl)methane. The isocyanate-tipped polyether can for example be produced by reacting a polyether polyol as described above with a diisocyanate at a ratio of isocyanate groups to hydroxyl groups of about 2:1. Alternatively, an isocyanate-tipped polyetherurethane can be used in place of the isocyanate-tipped polyether; this can be produced by reacting a polyether polyol with a diisocyanate at a ratio of isocyanate groups to hydroxyl groups below 2:1.

An alternative thermoplastic elastomer which can be applied from organic solvent solution or aqueous emulsion is a block copolymer of at least one vinyl aromatic polymer block and at least one diene or hydrogenated diene polymer block. The block copolymer can be a diblock copolymer but is preferably a triblock copolymer of the form A-B-A, where each A represents a vinyl aromatic polymer, for example polystyrene block, and B represents a diene polymer block such as a polybutadiene or polyisoprene block or a derivative thereof in which the diene polymer blocks are hydrogenated. The diene polymer or hydrogenated diene polymer block preferably forms 50-80% by weight of the block copolymer, for example the vinyl aromatic polymer blocks may have a molecular weight in the range 6000–50000 and the diene polymer blocks may have a molecular weight in the range 30000–150000.

The elastomeric undercoat preferably has an extensibility (elongation at break) of at least 150% and most preferably at least 200% and less than 1000%, for example 250 to 800%. The elastomeric undercoat preferably has a Shore A hardness of more than 50 and most preferably less than 100, for example 60–90. The elastomer of the undercoat preferably has a resilience of at least 25%, most preferably 25–60%.

The elastomeric undercoat can even be a cured silicone rubber having the above properties, although a non-silicious rubber is preferred. The room temperature vulcanisable silicone rubber compositions useful as foul resistant top coats generally have Shore A hardness less than the range of 60–90 preferred for the elastomeric undercoat.

The elastomeric undercoat is applied at a dry film thickness of at least 200 microns, preferably at least 300 microns and most preferably at least 500 microns. A thickness of 1500 microns is generally ample to allow development of maximum abrasion resistance of the silicone rubber layer. An elastomeric undercoat 500–1000 microns thick may be particularly preferred.

The elastomeric undercoat can be used as a primer applied direct to the substrate, which may for example be a hull of steel, aluminium or glass fibre-reinforced plastics or a static structure of concrete or steel. The elastomeric undercoat can alternatively be applied over an anticorrosive primer or over an existing layer of anticorrosive paint on the substrate.

The elastomeric undercoat can be unpigmented, or may be pigmented and/or plasticised to achieve the desired physical properties such as hardness, extensibility and resilience. Examples of pigments are $CaCO_3$, kaolin, calcined clay, $TiO_2$, an oxide of iron, zinc or chromium, zirconia, magnesia, alumina, boron nitride lithopone, barium metaborate, $BaSO_4$ or colouring pigments such as phthalocyanine pigments. The pigments are generally of particle size 0.1-60 microns. Reinforcing fillers such as fumed silica of particle size below 0.1 micron can also be used. If the elastomeric undercoat is applied to a steel substrate without an anticorrosive primer, the elastomeric undercoat preferably contains an anticorrosive pigment such as a phosphate pigment. The concentration of pigment in the dry film is generally less than 35% by volume and preferably less than 25%, for example 1-25%, preferably 5-25%.

The room temperature vulcanisable silicone rubber is preferably a polydiorganosiloxane having terminal groups which are Si-OH groups or groups hydrolysable to Si-OH groups. The silicone rubber is cured by a crosslinking reaction of the Si-OH groups.

The polydiorganosiloxane is formed of recurring units of the formula $-Si(R_2)O-$ where the radicals R, which can be the same or different within each unit or from unit to unit, are hydrocarbon radicals having 1 to 10 carbon atoms, for example alkyl, cycloalkyl, alkenyl or aromatic radicals such as methyl, ethyl, isopropyl, n-hexyl, cyclohexyl, vinyl or phenyl radicals. It preferably has a viscosity of at least 700 mPa.s at 25° C., most preferably at least 1000 mPa.s up to 100,000 mPa.s. The polydiorganosiloxane may contain monoorganosiloxy groups of the formula $RSiO_{1.5}$ and/or siloxy groups of the formula $SiO_2$ in a maximum proportion of 2% with respect to the number of diorganosiloxy groups $R_2SiO$. The polydiorganosiloxane may comprise a mixture of polydiorganosiloxanes differing in molecular weight and/or in the nature of the groups bonded to the silicon atoms.

Most preferably at least 50% of the total radicals R in the polydiorganosiloxane are methyl radicals. For best antifouling performance it is preferred that the polydiorganosiloxane contains phenyl radicals. The proportion of the radicals R in the polydiorganosiloxane which are phenyl radicals is preferably at least 0.1% and may be up to 10%, for example 0.2 to 5%. Preferred examples of the groups represented by $R_2SiO$ are $(CH_3)_2SiO$, $CH_3(C_6H_5)SiO$ and $(C_6H_5)_2SiO$. Alpha, omega-dihydroxypolydiorganosiloxanes containing such $R_2SiO$ groups are available commercially.

In one process according to the invention, the polydiorganosiloxane has terminal Si-OH groups and is mixed with a crosslinking agent (which has been packaged separately) within 8 hours before the room temperature vulcanisable silicone rubber is coated over the elastomeric undercoat. The crosslinking agent generally contains at least two silicon-bonded hydrolysable groups per molecules, and preferably has an average of at least 2.5 or 3 silicon-bonded hydrolysable groups per molecule.

When the polydiorganosiloxane and crosslinking agent are packaged separately, the molar ratio of crosslinking agent (B) to moles of silicon-bonded hydroxyl groups in polydiorganosiloxane (A) is at least 0.7:1 to ensure curing of the coating composition, and preferably less than 1.5:1 to achieve optimum foul resistance.

One example of a preferred crosslinking agent (B) is a ketiminoxysilane, for example:

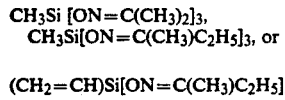

$(CH_2=CH)Si[ON=C(CH_3)C_2H_5]_3$

An alternative crosslinking agent is an acyloxysilane.

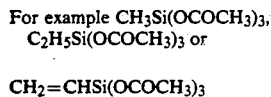

$CH_2=CHSi(OCOCH_3)_3$

Another alternative crosslinking agent is an alkoxysilane having at least 2, preferably at least 3, alkoxy groups bonded to silicone, for example a tetraalkyl silicate such as tetraethyl orthosilicate.

Alternatively the polydiorganosiloxane may have hydrolysable terminal groups such as ketiminoxysilyl groups or acyloxysilyl groups, which can be formed by the reaction of a polymer tipped by Si-OH groups with stoichiometric excess of a ketiminoxysilane or acyloxysilane, for example those described above as crosslinking agents. Such a polydiorganosiloxane having hydrolysable terminal groups can be stored as a single package and cured in the presence of moisture, for example atmospheric moisture. The molar ratio of moles of crosslinking agent reacted with silicon-bonded hydroxyl groups of the Si-OH tipped polydiorganosiloxane is generally at least 1:1 and preferably at least 1.5:1 to ensure storage stability. The resulting composition usually includes crosslinking agent (B) which is not yet chemically combined with the polydiorganosiloxane.

An alternative polydiorganosiloxane (A) tipped with silicon-bonded hydrolysable groups is an amine-tipped polydiorganosiloxane as sold under the Trade Marks "Silgan 500" and "Silgan 501J".

In a further alternative, a polydiorganosiloxane having hydrolysable terminal groups may be used as the first component of a two-pack room temperature vulcanisable silicone rubber coating composition. The other second component, to be admixed within 8 hours before application of the coating over the elastomeric undercoat, is a polydiorganosiloxane having terminal Si-OH groups, for example an alpha, omega-dihydroxypolydiorganosiloxane having a viscosity of 500 to 10000 mPa.s at 25° C. and formed of recurring diorganosiloxy units of the formula -Si(R$_2$)O-, where R is defined as above. The second component is free of crosslinking agent for Si-OH groups. The separately packaged alpha, omega-dihydroxypolydiorganosiloxane undergoes a crosslinking reaction with the silicon-bonded hydrolysable terminal groups of the polydiorganosiloxane of the first component.

The room temperature vulcanisable silicone rubber composition can contain, in addition to the curable polydiorganosiloxane and the curing agent therefor, a polyisocyanate and an active-hydrogen-providing compound as described in U.S. Pat. No. 5017322. The polyisocyanate and active hydrogen group compound together generally form less than 40% by weight of the polymer-forming components of the room temperature vulcanisable composition, so that the cured rubber consists of domains of polyurethane, polyurea or poly(urethane-urea) with a network of crosslinked polydiorganosiloxane.

Alternatively, the room temperature vulcanisable silicone rubber can contain grafted silicon-free segments as described in EP-B-32597 or EP-A-89071. Such silicon-free segments preferably form less than 30% by weight, most preferably less than 20%, of the silicone rubber.

The room temperature vulcanisable silicone rubber composition is however most preferably free from non-silicone polymers, since the coating system of the invention including a thick elastomeric undercoat imparts sufficient abrasion and impact resistance to the silicone rubber top coat.

The room temperature vulcanisable silicone rubber coating composition preferably contains at least one mineral filler. The filler can comprise a mixture of different materials of different particle size, for example 2 to 10% by weight, based on polydiorganosiloxane, of finely divided silica, which is preferably surface modified, with 0 to 100% by weight, based on polydiorganosiloxane, of a filler of particle size above 0.1 micron. Examples of suitable fillers are described in U.S. Pat. No. 4525565.

The silicone rubber coating composition preferably contains 1 to 50%, based on the weight of polydiorganosiloxane, of a non-reactive silicone oil of viscosity of 20 to 5000 mPa.s. The non-reactive silicone oil improves the resistance of the composition to aquatic fouling, as disclosed by GB-A-1470465. The non-reactive silicone oil is preferably a methyl phenyl silicone oil in which at least 25% of the diorganosiloxy units are methylphenylsiloxane units. Most preferably it is a methyl-terminated poly(methylphenylsiloxane). The oil preferably has a viscosity of 20 to 1000 mPa.s and is preferably used at 2 to 20% by weight based on the silicone rubber. An example of a preferred silicone oil is that sold under the Trade Mark "Rhodorsil Huile 550".

Alternatively, or additionally, the silicone rubber coating composition can contain a non-reactive fluid organic compound which may improve the resistance of the composition to aquatic fouling, as disclosed for example in GB-A-1581727 or GB-A-2141436. Examples of organic fluids which can be used are lubricating mineral oils such as white oil, low molecular weight polybutene, petrolatum or a liquid paraffin/petrolatum mixture.

The silicone rubber coating composition can be applied undiluted or in the form of a dispersion or solution in an organic diluent. Suitable diluents preferably are conventional commercially available products chosen from among, for example: aliphatic, cycloaliphatic or aromatic hydrocarbons such as n-heptane, n-octane, cyclohexane, methylcyclohexane or xylene; aliphatic or cycloaliphatic ketones such as methylisobutylketone, methylisoamylketone, cyclohexanone or isophorone; and esters such as ethyl acetate, butyl acetate or ethoxyethyl acetate. Mixtures of diluents can be used, for example a hydrocarbon diluent can be mixed with a more polar organic diluent such as a ketone. The amount of diluent introduced is generally such as to obtain a stable dispersion which can be spread easily over substrates, for example by paint spray apparatus. This depends essentially on the nature and viscosity of the polydiorganosiloxane composition and can vary widely, for example from 5 to 150% by weight diluent based on the weight of polydiorganosiloxane.

The silicone rubber coating composition can be applied by spray, roller or brush. If it is stored as a multipack composition the packages are mixed shortly before application of the coating composition to the substrate, generally no more than 8 hours before application and preferably no more than 2 hours before application. They can be mixed in a container and then applied by spray, roller or brush or can be mixed during application in a twin feed spray, for example a twin-feed airless spray. The silicone rubber coating is generally applied at a dry film thickness of 5 to 300 microns, preferably 10 to 200 microns.

The room temperature vulcanisable silicone rubber coating has limited adhesion to many types of elastomeric undercoat. If improved adhesion is required, the layer of elastomeric undercoat on the substrate is preferably pre-treated with a tie coat which has good adhesion to the elastomer and to which the polydiorganosiloxane composition adheres well. Such a tie coat can be based on an adhesion promoter such as an aminosilane. For example, that sold under the Trade Mark "Intersleek Tie-Coat" comprises a silicone resin or elastomer containing an aminosilane. Alternatively the tie coat may comprise an aminosilane and a chlorinated polyolefin, as described in FR-A-2636958. An intermediate coat comprising a mixture of such an aminosilane-based tie coat with a room temperature vulcanisable silicone rubber composition can alternatively or additionally be used.

The tie coat or intermediate coat can be applied from solution or dispersion in an organic diluent, for example an organic diluent selected from those listed above for the silicone rubber composition. The dry film thickness of the tie coat or intermediate coat can for example be 5 to 100 microns, preferably 10 to 75 microns.

As an alternative, an adhesion promoter such as an aminosilane can be incorporated in the elastomeric undercoat.

The coating system of the invention can also be used to prevent the adhesion of ice, for example on the superstructure of ships.

The invention is illustrated by the following Examples in which parts and percentages are by weight.

EXAMPLE 1

A thermoplastic elastomer sold under the Trade Mark "Kraton FG 1901 X" and believed to be a hydrogenated polystyrene/diene polymer/polystyrene triblock copolymer was dissolved at 20% by weight in xylene. This elastomer had a Shore A hardness of 75 and an extensibility of 500%. The elastomer solution was sprayed on a metal panel in multiple coats to build up a film thickness of about 500 microns.

This elastomeric undercoat was coated with a 75 micron coat of an adhesion promoting coating comprising 0.4% N-(2-aminoethyl)-3-aminopropyl trimethoxy silane and 2% chlorinated polyethylene in a room temperature vulcanisable silicone rubber derived from an alpha, omega-dihydroxypolydimethylsiloxane and a ketiminoxysilane curing agent.

A room temperature vulcanisable silicone rubber foul resistant coating composition was prepared from the following materials:

|  | Parts by weight |
| --- | --- |
| Silicone rubber | 47.8 |
| "Rhodorsil Huile 550" | 5.0 |
| "Rhodorsil 48 V 3500" | 13.5 |
| Pigments and fillers (TiO$_2$, black pigment, fumed silica) | 8.2 |
| Xylene | 25.5 |

The silicone rubber was a polydimethylsiloxane containing 0.65% diphenylsiloxy units and had a viscosity of about 7000 mPa.s. It was tipped with hydrolysable ketiminoxy groups derived from methyl tris(methyl ethyl ketiminoxy) silane and vinyl tris(methyl ethyl ketiminoxy) silane crosslinkers used at a molar ratio of ketiminoxysilane crosslinkers to Si-OH groups of 1.73:1. "Rhodorsil Huile 550" is a methyl-terminated poly(methyl phenyl siloxane) oil. "Rhodorsil 48 V 3500" is an alpha, omega-dihydroxypolydimethylsiloxane of viscosity 3500 mPa.s at 25° C. (Rhodorsil is a Trade Mark).

The silicone rubber foul resistant coating composition was applied by spray over the adhesion promoting coat at a dry film thickness of about 50 microns. The foul resistant coating was allowed to cure for 24 hours. After the coating was cured it was extremely difficult to damage the coating by fingernail scratching, and the coating showed substantial resistance to cutting with a knife. By comparison, if an undercoat of the "Kraton FG 1901 X" elastomer was used at a thickness of about 30 microns, the silicone rubber top coat could easily be damaged by fingernail scratching.

EXAMPLE 2

An elastomeric polyurethane coating was formed by mixing the following materials and spraying the composition onto a metal panel to build a thickness of 600 microns. The polyurethane formed had a Shore A hardness of 73 and an extensibility of 250%.

| Liquid Polyoxypropylene glycol of molecular weight 1000 and hydroxyl number 111–116 | 43.96 |
| --- | --- |
| Liquid Polyoxypropylene glycol of molecular weight 2000 and hydroxyl number 54.7–57.5 | 24.38 |
| 1,3-bis(1-isocyanato-1-methyl-ethyl) benzene | 22.59 |
| "Thermalite 31" organic tin compound catalyst | 0.01 |
| Fumed Silica | 1.35 |
| 1,1,1-Trichloroethane | 7.71 |
| Pigment Component | |
| N-Butyl Acetate | 30.32 |
| Pigments (alumina, kaolin, TiO$_2$, fumed silica, phthalocyanine blue) | 36.43 |
| Diethylmethylbenzene diamine | 6.09 |
| Water | 0.07 |
| Pelagonic Acid | 0.25 |
| Toluene Diisocyanate extended liquid Polyoxypropylene Glycol | 1.85 |

The polyurethane undercoat formed was overcoated with an adhesion promoting coating and a room temperature vulcanisable silicone rubber fouling resistant top coat as described in Example 1. The resistance of the silicone rubber top coat to abrasion, scratching and cutting was as good as was achieved by the coating system of Example 1.

EXAMPLE 3

An elastomeric polyurea coating was formed by brush applying the following composition onto metal panels at a dry film thickness of 750 microns. The polyurea elastomer produced had Shore A hardness 75 and extensibility 650%.

|  | % by weight |
|---|---|
| Isocyanate-tipped polyether derived from isophorone diisocyanate and polyoxyalkylene diol | 90.9 |
| Diethylmethylbenzene diamine | 6.1 |
| Propylene carbonate | 3.0 |

This elastomeric polyurea undercoat was overcoated with an adhesion promoting coating and a room temperature vulcanisable silicone rubber fouling resistant top coat as described in Example 1. The resistance of the silicone rubber top coat to abrasion, scratching and cutting was as good as was achieved by the coating system of Example 1.

Panels coated according to this Example were suspended from a raft in sea water off Miami, Fla. to assess resistance to fouling by marine organisms. The panels remained substantially free from fouling for 8 months; any fouling present could be removed by medium pressure water hosing. The fouling resistance of the panels was at least as good as panels coated with the same silicone rubber top coat without the thick elastomeric undercoat; in fact it appeared even better although both sets of panels were virtually fouling-free over this period.

The panels coated according to the invention which had been immersed in the sea remained resistant to damage by scratching, tearing or abrasion.

The coating of Example 3 can be pigmented using the pigment component of Example 2 if desired.

We claim:

1. A process for protecting a rigid substrate against aquatic fouling comprising coating the substrate with an elastomeric undercoat as a 200 to 1500 micron thick layer and with a top coat of a room temperature vulcanizable silicone rubber, the elastomer of said undercoat being a polymer having the ability to be stretched to at least twice its original length and to retract rapidly, with retraction of at least 90% of extension, when released, said undercoat being harder than the room temperature vulcanizable silicone rubber top coat.

2. A process according to claim 1, wherein the elastomeric undercoat has a Shore A hardness of 60 to 90.

3. A process according to claim 1, wherein the elastomeric undercoat has an extensibility of 250 to 800%.

4. A process according to claim 1, wherein the elastomeric undercoat comprises an elastomeric polyurethane, polyurea or poly(urethane-urea).

5. A process according to claim 4, wherein the elastomeric polyurea is derived from an isocyanate-tipped polyether and a diamine.

6. A process according to claim 1, wherein the elastomeric undercoat comprises an elastomeric block copolymer of at least one vinyl aromatic polymer block and at least one diene polymer block or hydrogenated diene polymer block.

7. A process according to claim 1, wherein the elastomeric undercoat is applied as a layer at least 500 microns thick.

8. A process for protecting a rigid substrate against aquatic fouling comprising coating the substrate with an elastomeric undercoat layer at least 300 microns thick of a coating having a Shore A hardness of 60 to 90 and an extensibility of 200 to 800%, and with a top coat of a room temperature vulcanizable silicone rubber having a Shore A hardness of less than that of the elastomeric undercoat.

9. A process according to claim 1, wherein the room temperature vulcanisable silicone rubber is a polydiorganosiloxane having terminal groups which are Si-OH groups or groups hydrolysable to Si-OH groups, and the silicone rubber is cured by a crosslinking reaction of the said Si-OH groups.

10. A process according to claim 9, wherein the polydiorganosiloxane has terminal Si-OH groups and is mixed with a crosslinking agent within 8 hours before the room temperature vulcanisable silicone rubber is coated on the substrate over the elastomeric undercoat.

11. A process according to claim 9, wherein the polydiorganosiloxane has hydrolysable terminal groups formed by the reaction of Si-OH groups with a ketiminoxysilane or acyloxysilane.

12. A process according to claim 11 wherein a polydiorganosiloxane having hydrolysable terminal groups and a polydiorganosiloxane having terminal Si-OH groups are mixed to form the room temperature vulcanisable silicone rubber, which silicone rubber is coated on the substrate over the elastomeric undercoat within 8 hours of mixing.

13. A process according to claim 1, wherein the room temperature vulcanisable silicone rubber contains a non-reactive fluid polydiorganosiloxane.

14. A process according to claim 13, wherein the non-reactive fluid polydiorganosiloxane is a methyl phenyl silicone oil.

15. A process according to claim 1, wherein the room temperature vulcanisable silicone rubber contains a non-reactive fluid organic compound selected from the group consisting of lubricating mineral oils, low molecular weight polybutene, petrolatum and liquid paraffin/petrolatum mixtures.

16. A process according to claim 1 wherein an intermediate coating is applied over the elastomeric undercoat and before application of the room temperature vulcanisable silicone rubber to improve adhesion of the silicone rubber to the elastomeric undercoat.

17. A process according to claim 16, wherein the intermediate coating comprises an aminosilane.

18. A process according to claim 17, wherein the intermediate coating additionally contains a chlorinated polyolefin.

19. A rigid substrate having a surface which is intended to be in contact with water in use, wherein said surface is coated with a 200 to 1500 micron thick undercoat layer of an elastomer, said elastomer being a polymer having the ability to be stretched to at least twice its original length and to retract rapidly, with retraction being at least 90% of extension, when released, and a anti-fouling top coat of a room temperature vulcanizable silicone rubber, the elastomeric undercoat being harder than the room temperature vulcanizable silicone rubber top coat.

* * * * *